United States Patent Office 2,859,218
Patented Nov. 4, 1958

2,859,218

PRODUCTION OF GLUTAMIC ACID

Marcus A. Stevens, Niagara Falls, N. Y., assignor to E. I. du Pont de Nemours and Company, Wilmington, Del., a corporation of Delaware No Drawing. Application August 1, 1955
Serial No. 525,774

6 Claims. (Cl. 260—309.5)

This invention relates to a method for producing glutamic acid and particularly to a method starting with furfural.

Glutamic acid has long been used in the food industry, e. g., in the form of monosodium glutamate, to enhance the flavor of various food products. Glutamic acid for this and other uses has hitherto been obtained from natural sources such as Steffen's waste and wheat and corn gluten. The processes employed for obtaining the acid from such sources are complex and costly and result in comparatively expensive glutamic acid. Routes for synthesizing this acid from starting materials such as acrylic esters and succinic acid have been proposed, but such methods are disadvantageous because of the relatively high cost of the starting materials. The present invention relates to a synthesis route starting with relatively inexpensive furfural which is readily available.

One object of the invention is to provide a new method for producing glutamic acid. Another object is to provide a method for synthesizing glutamic acid involving the reaction of a 2-keto-5-alkoxytetrahydrofuran with compounds yielding cyanide, ammonium and carbonate ions to produce 5-($\beta$-carboxyethyl) hydantoin which is then hydrolyzed to glutamic acid. A still further object is to provide a new synthetic route to glutamic acid starting with furfural. Other objects will be apparent from the following description.

The objects of the invention are accomplished by reacting in an aqueous medium a 2-keto-5-alkoxytetrahydrofuran, a compound yielding cyanide ions, a compound yielding carbonate ions and a compound yielding ammonium ions, and hydrolyzing the resulting 5-($\beta$-carboxyethyl) hydantoin to DL-glutamic acid. In one embodiment of the invention, furfural in solution in a lower aliphatic alcohol is photo-chemically oxidized with gaseous oxygen to a 2-keto-5-alkoxy-2,5-dihydrofuran, which is catalytically hydrogenated to the corresponding 2-keto-5-alkoxytetrahydrofuran. The latter is then converted as indicated to 5-($\beta$-carboxyethyl) hydantoin which can be readily hydrolyzed to obtain glutamic acid in good yields.

The oxidation of furfural is effected in a liquid phase comprising a solution of furfural in a saturated aliphatic alcohol. The preferred solvents are the lower alcohols such as the hexanols, the pentanols, the butanols, the propanols, ethanol and methanol. The most preferred solvents are the alcohols of 1–3 carbons, i. e., methanol, ethanol, n-propanol and iso-propanol. The oxidation is effected employing molecular oxygen, e. g., oxygen gas or air, as the oxidizing agent. The oxidation is carried out in the presence of actinic light such as sunlight, light from incandescent lamps and, preferably, ultraviolet light. The presence in the reaction mixture of a photosensitizer such as methylene blue, chlorophyll or eosin is advantageous in accelerating the light catalyzed reaction.

The alkoxy substituent group in the ketoalkoxydihydrofuran resulting from the oxidation of furfural is derived from the alcohol solvent employed. Thus, when the solvent is methanol, ethanol or isopropanol, respectively, the alkoxy group will be methoxy, ethoxy or isopropoxy. The proportion of furfural to alcohol employed in the solution to be oxidized generally should be such that the furfural concentration will not exceed about 40% by weight. Preferably, the furfural concentration will range from about 5 to 25%.

The intermediate ketoalkoxydihydrofuran is next catalytically hydrogenated to the corresponding ketoalkoxytetrahydrofuran. Any of the common hydrogenation catalysts, particularly metallic nickel and those of the platinum metal group such as metallic platinum and metallic palladium, supported or not, are suitable. The preferred catalyst is Raney nickel, which generally will be employed at temperatures ranging from about 50 to 150° C., preferably 70 to 100° C., and at a pressure at least sufficient to maintain the solvent, if used, in the liquid condition. Much higher hydrogen pressures, e. g., up to around 2,000 lbs. per square inch, can be employed but pressures in the range of from about 50 to 150 p. s. i. g. are generally quite satisfactory to give substantially quantitative yields of the ketoalkoxytetrahydrofuran. Somewhat lower temperatures and pressures can be used when employing a platinum metal catalyst; thus, with a supported palladium catalyst, hydrogenation at room temperature and pressure is feasible. The hydrogenation can be effected in the presence or absence of a solvent or diluent. When a solvent is used, any inert liquid which is a solvent for the ketoalkoxydihydrofuran and the product can be employed. Since an aliphatic alcohol solvent is required in the furfural oxidation step and since it is preferred not to isolate the resulting ketoalkoxydihydrofuran prior to hydrogenating the same, the preferred solvent for use in the hydrogenation step is the lower aliphatic alcohol employed as solvent in the preceding oxidation step.

The ketoalkoxytetrahydrofuran is readily separated from the hydrogenation reaction mixture by fractional distillation. The intermediate 5-($\beta$-carboxyethyl) hydantoin is then obtained by reacting in an aqueous reaction medium the 2-keto-5-alkoxytetrahydrofuran, a compound yielding cyanide ions, a compound yielding ammonium ions and a compound yielding carbonate ions. The reaction is preferably carried out at elevated temperature, e. g., in the range of about 50–80° C. for about 1 to several hours. The reaction is slow below about 40° C. Temperatures above about 80° C., e. g., up to 100° C. or higher, can be employed, particularly when employing a carbon dioxide atmosphere under pressure, in fact, use of carbon dioxide under pressure is preferred whenever temperatures above about 60° C. are employed.

The medium in which formation of the hydantoin is carried out should be aqueous, although substantial amounts of a solvent, e. g., a lower alcohol, other than water can be present. Generally, the water content of the medium should be at least 30% and may range up to 100%. The reaction can be carried out employing ketoalkoxytetrahydrofuran isolated by fractional distillation from the reaction mixture of the preceding hydrogenation step, or the crude hydrogenation mixture, after separation of the hydrogenation catalyst therefrom, can simply be diluted with water and then employed in the reaction to produce the hydantoin.

By compounds yielding cyanide ions, ammonium ions or carbonate ions is meant any compound which when added to the aqueous reaction medium will yield therein a substantial concentration of cyanide, ammonium or carbonate ions. Hydrocyanic acid, and alkali metal and alkaline earth metal and ammonium cyanides are examples of compounds yielding cyanide ions. Ammonium carbonate, or ammonia and carbon dioxide are illustrative of compounds yielding both ammonium and carbonate ions. Other compounds yielding one or both of these ions are ammonium chloride, ammonium carbamate and sodium carbonate. Sodium cyanide and hydrocyanic acid are preferred compounds yielding cyanide ions. Ammonium carbonate, or ammonia (gaseous or liquid) and carbon dioxide, are preferred sources of ammonium and carbonate ions.

The reaction to produce the carboxyethyl hydantoin is preferably carried out under alkaline conditions such as those existing when employing sodium cyanide and ammonium carbonate as reactants. Neutral or slightly acidic conditions can also be used. A substantial excess of any of the individual reactants can be employed but an excess of the ketoalkoxytetrahydrofuran is preferably avoided for economic reasons. Generally suitable proportions of the reactants are 1 to 2.5 moles of cyanide ions, 1 to 10 moles of carbonate ions and 1 to 15 moles of ammonium ions per mole of the ketoalkoxytetrahydrofuran.

The carboxyethyl hydantoin intermediate can be isolated and purified prior to being hydrolyzed to glutamic acid, but such isolation is not necessary since the intermediate crude solution of the hydantoin can be hydrolyzed directly. Hydrolysis can be effected by heating with water under acidic or alkaline conditions, preferably in the presence of an excess of a strong acid or strong base. Preferably, a 10 to 100% excess of the acid or base will be employed at temperatures from around the atmospheric boiling point of the mixture up to about 250° C. When using temperatures above the normal boiling temperature, the use of closed reaction vessels capable of withstanding pressure corresponding to the temperature employed will be necessary. The higher the temperature, the more rapid will be the hydrolysis. However, neither temperature nor pressure is critical and the temperature will generally be chosen keeping in mind the time required for completion of the hydrolysis. Progress of the hydrolysis may be followed roughly by determining the amount of carbon dioxide (a by-product of the reaction) evolved, or by periodically determining the yield of glutamic acid.

The invention is illustrated by the following examples.

Example 1

Furfural was photo-chemically oxidized employing an apparatus comprising two concentric glass tubes fused together at the top and bottom and closed at the base to form a Dewar-shaped vessel. A 100-watt mercury vapor lamp was positioned above the vessel to provide ultraviolet light for irradiating liquid between the concentric tubes. A solution of furfural (600 g.) and eosin (6 g.) in ethanol (2550 ml.) was recycled continuously from a water-cooled (20° C.) storage vessel, through the annular space between the concentric tubes (where it was irradiated) and back to the storage vessel. During recirculation of the solution, air was blown into the bottom of the solution in the annular space through a porous thimble in the base. Operation was discontinued after 24 hrs., at which time most of the eosin had become decolorized. The solution was then fractionally distilled through a Schneider column under reduced pressure to give ethanol, B. P. 25° C./20 mm.; furfural (500 g.), B. P. 50° C./20 mm.; and 2-keto-5-ethoxy-2,5-dihydrofuran (40 g.), B. P. 80° C./2 mm. Yield of the latter, based upon furfural consumed, was about 30%.

Example 2

A mixture of Raney nickel (8 g.) with a solution of 2-keto-5-ethoxy-2,5-dihydrofuran (63.5 g.), obtained as in Example 1, in ethanol (80 ml.) was charged to a 1500 ml. chrome-steel shaker bomb. The bomb was pressured with nitrogen at 25 p. s. i. g., shaken and heated to 90° C. The contents of the bomb were then kept under hydrogen at about 100 p. s. i. g. for 30 min. at 90° C., then removed and fractionally distilled. 2-keto-5-ethoxytetrahydrofuran, boiling at 80° C./2mm., was obtained in a quantitative yield.

Example 3

A mixture of 2-keto-5-ethoxytetrahydrofuran (12.8 g.), obtained as in Example 2, water (75 ml.), sodium cyanide (8 g.) and ammonium carbonate (29 g.), was stirred at 60°C. for 24 hours. The resulting mixture was evaporated to half bulk to remove unreacted ammonium carbonate, then diluted back to its original volume with water and stirred with a cation exchange resin (190 ml. of 50-100 mesh resin in its hydrogen form) which was a sulfonated copolymer of styrene and divinyl benzene. The resin was then filtered from the mixture and washed with liberal quantities of water. The filtrate and washings were combined and evaporated to a residue of about 40 ml. which was allowed to crystallize. After filtering off the crystals and further concentrating the filtrate, a second batch of crystals was obtained and repetition of the procedure gave a third crop of crystals. A total of 7.2 g. of 5-(β-carboxyethyl) hydantoin was obtained in the three crystallizations, representing a yield of 43% based upon the starting keto-ethoxytetrahydrofuran. Further amounts of the hydantoin product, which is very soluble in water, were present in the final filtrate and could be converted to glutamic acid by heating the filtrate with strong acid or alkali at elevated temperatures.

Example 4

5-(β-carboxyethyl) hydantoin (20 g.), obtained as in Example 3, was heated with concentrated (35%) hydrochloric acid (80 ml.) in a pressure reactor at 180° C. for 5 hours. The contents of the reactor were then cooled, removed, and diluted with an equal volume of water. The hydrochloric acid in the resulting hydrolyzate solution was removed by stirring the solution with an anion exchange resin (1 liter of 20-50 mesh resin in its hydroxyl form) which was a weakly basic, polystyrene base, polyamine-type resin. Stirring was continued until the pH of the solution rose to 3 after which the resin was filtered off and the filtrate evaporated until crystallization commenced. Cooling caused precipitation of DL-glutamic acid (11.8 g.), M. P. 185° C. Analysis and a mixed melting point determination with a sample of authentic glutamic acid established identity of the product.

Hot (60° C.) 10% hydrochloric acid was run down a column of the anion exchange resin which had been filtered from the product solution as described above. The purpose was to extract residual product from the resin. The effluent solution from the column before the breakthrough of chloride ion contained 2.1 g. glutamic acid. Total glutamic acid obtained was 13.9 g., representing an 82% yield based upon the starting carboxyethyl hydantoin.

As indicated previously, the intermediate compounds resulting from the oxidation, reduction and hydantoin reaction steps of the present route need not be separated from their respective reaction mixtures prior to use in the succeeding step. However, separation and purification of such intermediates prior to their use are advantageous in that the recovery of pure glutamic acid from the final hydrolysis reaction mixture is thereby facilitated. Purification of the intermediate solution of the carboxyethyl hydantoin can be effectively achieved by boiling to destroy excess ammonium carbonate and then passing the solution through a cation exchange resin in its hydrogen form to remove metal ion impurities. The effluent solution of the hydantoin can be hydrolyzed directly to glutamic acid, or the hydantoin may be separated from the solution by crystallization or other convenient method and then hydrolyzed. The cation exchange resin employed to remove metal ions may be any of the usual cation exchange resins containing active exchange groups of the sulfonic, phosphonic, phosphonous or carboxylic acid types. Those resins of the nucelar sulfonated aromatic hydrocarbon type are generally preferred.

Separation of the glutamic acid from the hydrolyzate mixture can be achieved in any desired way and the method chosen will depend somewhat upon the particular acid or base employed in hydrolyzing the carboxyethyl hydantoin. If an acid such as hydrochloric or sulfuric acid is employed in the hydrolysis, removal of excess acid by means of a weakly basic anion exchange resin in its hydroxyl form is particularly preferred. The resin should be of the amine type, the quaternary ammonium type resin being too strongly basic for the present purpose. Glutamic acid can be recovered from the remaining solution by crystallization or other methods. If a base such as caustic soda is employed in the hydrolysis, recovery of the glutamic acid may be accomplished by running the hot alkaline hydrolyzate through a nuclear sulfonated aromatic hydrocarbon-type rsein in the acid form and collecting effluent up to a pH of 4 which effluent will contain the glutamic acid substantially free of metal cations.

The present invention provides a new and practical route for synthesizing glutamic acid. Because relatively cheap furfural is the starting material, the present route is distinctly advantageous over previously suggested synthetic routes which require more costly starting materials.

I claim:

1. The method of producing 5-(β-carboxyethyl) hydantoin comprising photo-chemically oxidizing furfural in a solution of a lower aliphatic alcohol; catalytically hydrogenating the resulting 2-keto-5-alkoxydihydrofuran to obtain the corresponding 2-keto-5-alkoxytetrahydrofuran; and reacting the latter compound, a compound yielding cyanide ions, a compound yielding ammonium ions and a compound yielding carbonate ions to obtain said 5-(β-carboxyethyl) hydantoin.

2. The method of claim 1 wherein the furfural solution submitted to photo-chemical oxidation contains a photosensitizer and the solvent for the furfural is an alcohol having 1 to 3 carbons.

3. The method of claim 2 wherein the photosensitizer is eosin.

4. The method of claim 1 wherein the hydrogenation of the 2-keto-alkoxydihydrofuran is effected in the presence of Raney nickel.

5. The method for producing 5-(β-carboxyethyl) hydantoin comprising reacting in an aqueous medium a 2-keto-5-alkoxytetrahydrofuran, a compound yielding cyanide ions, a compound yielding ammonium ions and a compound yielding carbonate ions.

6. The method of claim 5 employing 2-keto-5-ethoxytetrahydrofuran.

References Cited in the file of this patent

UNITED STATES PATENTS

| 2,543,817 | Weil | Mar. 6, 1951 |
| 2,557,904 | Britton et al. | June 19, 1951 |
| 2,564,647 | Rogers | Aug. 14, 1951 |
| 2,658,912 | Pfister et al. | Nov. 10, 1953 |
| 2,663,713 | White et al. | Dec. 22, 1953 |

OTHER REFERENCES

Henze et al.: J. Am. Chem. Soc., vol. 64, pages 522–3 (1942).

Mentzer et al.: Chem. Abstracts, vol. 46, column 2500 (1952).